US011518500B2

(12) United States Patent
Good et al.

(10) Patent No.: US 11,518,500 B2
(45) Date of Patent: Dec. 6, 2022

(54) AIRCRAFT HAVING FOLDABLE WINGS

(71) Applicant: The Boeing Company, Chicago, IL (US)

(72) Inventors: Mark Steven Good, Seattle, WA (US); Steven Paul Walker, Arlington, WA (US)

(73) Assignee: THE BOEING COMPANY, Chicago, IL (US)

( * ) Notice: Subject to any disclaimer, the term of this patent is extended or adjusted under 35 U.S.C. 154(b) by 302 days.

(21) Appl. No.: 16/680,037

(22) Filed: Nov. 11, 2019

(65) Prior Publication Data
US 2020/0346740 A1    Nov. 5, 2020

Related U.S. Application Data

(60) Provisional application No. 62/843,021, filed on May 3, 2019.

(51) Int. Cl.
*B64C 5/08*    (2006.01)
*B64C 3/56*    (2006.01)
*B64C 23/06*    (2006.01)

(52) U.S. Cl.
CPC .............. *B64C 23/072* (2017.05); *B64C 5/08* (2013.01); *B64C 3/56* (2013.01)

(58) Field of Classification Search
CPC ........... B64C 23/072; B64C 5/08; B64C 3/56
See application file for complete search history.

(56) References Cited

U.S. PATENT DOCUMENTS

| | | | |
|---|---|---|---|
| 1,396,177 A | * | 11/1921 | Gerard ...................... B64C 3/56 403/361 |
| 4,778,129 A | | 10/1988 | Byford |
| 5,201,479 A | | 4/1993 | Renzelmann |
| 5,350,135 A | | 9/1994 | Renzelmann et al. |
| 5,372,336 A | | 12/1994 | Paez |
| 5,381,986 A | | 1/1995 | Smith et al. |
| 5,452,643 A | | 9/1995 | Smith et al. |

(Continued)

FOREIGN PATENT DOCUMENTS

| CN | 109436297 | 3/2019 |
|---|---|---|
| EP | 2937280 | 10/2015 |

(Continued)

OTHER PUBLICATIONS

Ishimitsu et. al., Design and Analysis of Winglets for Military Aircraft, 1976, Boeing Commercial Airplane Company, p. 50 (Year: 1976).*

(Continued)

*Primary Examiner* — Richard R. Green
*Assistant Examiner* — Madison Elizabeth Dittner
(74) *Attorney, Agent, or Firm* — Hanley, Flight & Zimmerman, LLC

(57) ABSTRACT

Aircrafts having foldable wings are disclosed. An example aircraft includes a fixed wing portion, a foldable wing tip, and a hinge interface to pivotally couple the foldable wing tip and the fixed wing portion. The hinge interface has a first hinge defining a hinge axis that is substantially parallel to a fuselage centerline. The first hinge has a first dimension in a spanwise direction and a second dimension in a chordwise direction. The first dimension is greater than the second dimension.

24 Claims, 11 Drawing Sheets

(56) References Cited

U.S. PATENT DOCUMENTS

| | | | |
|---|---|---|---|
| 8,490,925 B2* | 7/2013 | Buescher | B64C 23/069 |
| | | | 244/45 R |
| 8,708,286 B2 | 4/2014 | Sakurai et al. | |
| 8,733,692 B2 | 5/2014 | Kordel et al. | |
| 8,946,607 B2 | 2/2015 | Gettinger | |
| 9,045,217 B2 | 6/2015 | Kordel et al. | |
| 9,047,771 B1 | 6/2015 | Thoreen et al. | |
| 9,211,946 B2 | 12/2015 | Good et al. | |
| 9,290,260 B2 | 3/2016 | Lassen et al. | |
| 9,296,469 B2 | 3/2016 | Santini et al. | |
| 9,296,472 B2 | 3/2016 | Thoreen et al. | |
| 9,415,857 B2 | 8/2016 | Fox et al. | |
| 9,440,730 B2 | 9/2016 | Kordel et al. | |
| 9,469,392 B2 | 10/2016 | Fox et al. | |
| 9,481,446 B2* | 11/2016 | Lassen | B64C 3/56 |
| 9,499,252 B2 | 11/2016 | Lassen et al. | |
| 9,533,758 B2 | 1/2017 | Gettinger | |
| 9,580,166 B2 | 2/2017 | Good et al. | |
| 9,610,618 B2 | 4/2017 | Gaw | |
| 9,701,392 B2 | 7/2017 | Whitlock et al. | |
| 9,783,284 B2 | 10/2017 | Townsend et al. | |
| 9,873,502 B2 | 1/2018 | Good et al. | |
| 9,889,920 B2* | 2/2018 | Harding | B64C 23/072 |
| 9,908,612 B2 | 3/2018 | Fox | |
| 9,914,523 B2 | 3/2018 | Good et al. | |
| 9,914,524 B2 | 3/2018 | Good et al. | |
| 9,919,809 B2 | 3/2018 | Moy et al. | |
| 9,950,780 B2 | 4/2018 | Santini et al. | |
| 9,950,810 B2 | 4/2018 | Thoreen et al. | |
| 9,957,831 B2 | 5/2018 | Soman et al. | |
| 10,106,244 B2 | 10/2018 | Good et al. | |
| 10,227,143 B2 | 3/2019 | Good | |
| 10,370,084 B2 | 8/2019 | Cline et al. | |
| 10,392,101 B2* | 8/2019 | Axford | B64C 23/072 |
| 10,538,307 B2 | 1/2020 | Dees et al. | |
| 10,583,909 B2* | 3/2020 | Alexander | B64C 3/42 |
| 11,155,330 B2* | 10/2021 | King | B64C 3/185 |
| 2009/0283639 A1 | 11/2009 | Ackermann et al. | |
| 2011/0089292 A1 | 4/2011 | Williams et al. | |
| 2013/0292508 A1* | 11/2013 | Fox | B64C 3/56 |
| | | | 244/49 |
| 2014/0319268 A1 | 10/2014 | Lassen et al. | |
| 2015/0360770 A1 | 12/2015 | Good | |
| 2016/0137285 A1 | 5/2016 | Good et al. | |
| 2016/0167092 A1 | 6/2016 | Gaw | |
| 2016/0251073 A1 | 9/2016 | Good et al. | |
| 2016/0362171 A1 | 12/2016 | Lassen et al. | |
| 2017/0152017 A1 | 6/2017 | Good et al. | |
| 2017/0174314 A1 | 6/2017 | Diamante | |
| 2017/0321804 A1 | 11/2017 | Soman et al. | |
| 2018/0105256 A1 | 4/2018 | Good et al. | |
| 2018/0120525 A1 | 5/2018 | Leigh et al. | |
| 2018/0148159 A1 | 5/2018 | Good et al. | |
| 2018/0170516 A1 | 6/2018 | Niemiec et al. | |
| 2020/0247526 A1 | 8/2020 | Dees et al. | |
| 2022/0024559 A1 | 1/2022 | Horwood et al. | |

FOREIGN PATENT DOCUMENTS

| | | |
|---|---|---|
| EP | 3263446 A1 | 1/2018 |
| EP | 3575204 | 12/2019 |
| EP | 3689738 | 8/2020 |

OTHER PUBLICATIONS

Dussart et. al., In-flight folding wingtip system: inspiration from the XB-70 Valkyrie, Jan. 2019, AIAA Sci Tech Forum, p. 13 (Year: 2019).*

European Patent Office, "Extended European Search Report," issued in connection with European Patent Application No. 20170853.4, dated Sep. 28, 2020, 14 pages.

Wikipedia, "Boeing 777X," dated Mar. 30, 2020, retrieved from [https://webarchive.org/web.20190330145335/http://en.wikipedia.org/wiki/Boeing_777X] on Sep. 18, 2020, 15 pages.

European Patent Office, "Extended European Search Report," issued in connection with European Patent Application No. 19218619.5, dated Jun. 24, 2020, 9 pages.

European Patent Office, "Communication pursuant to Article 94(3) EPC" issued in connection with European Patent Application No. 19 218 619.5, dated Jun. 25, 2021, 5 pages.

European Patent Office, "Communication pursuant to Article 94(3) EPC," issued in connection with European Patent Application No. 20170853.4, dated Sep. 23, 2021, 7 pages.

United States Patent and Trademark Office, "Non-Final Office Action," issued in connection with U.S. Appl. No. 16/580,762, dated Feb. 23, 2022, 8 pages.

European Patent Office, "Communication Pursuant to Article 94(3) EPC" issued in connection with European Appl. No. 20170853.4, dated Oct. 6, 2022, 7 pages.

* cited by examiner

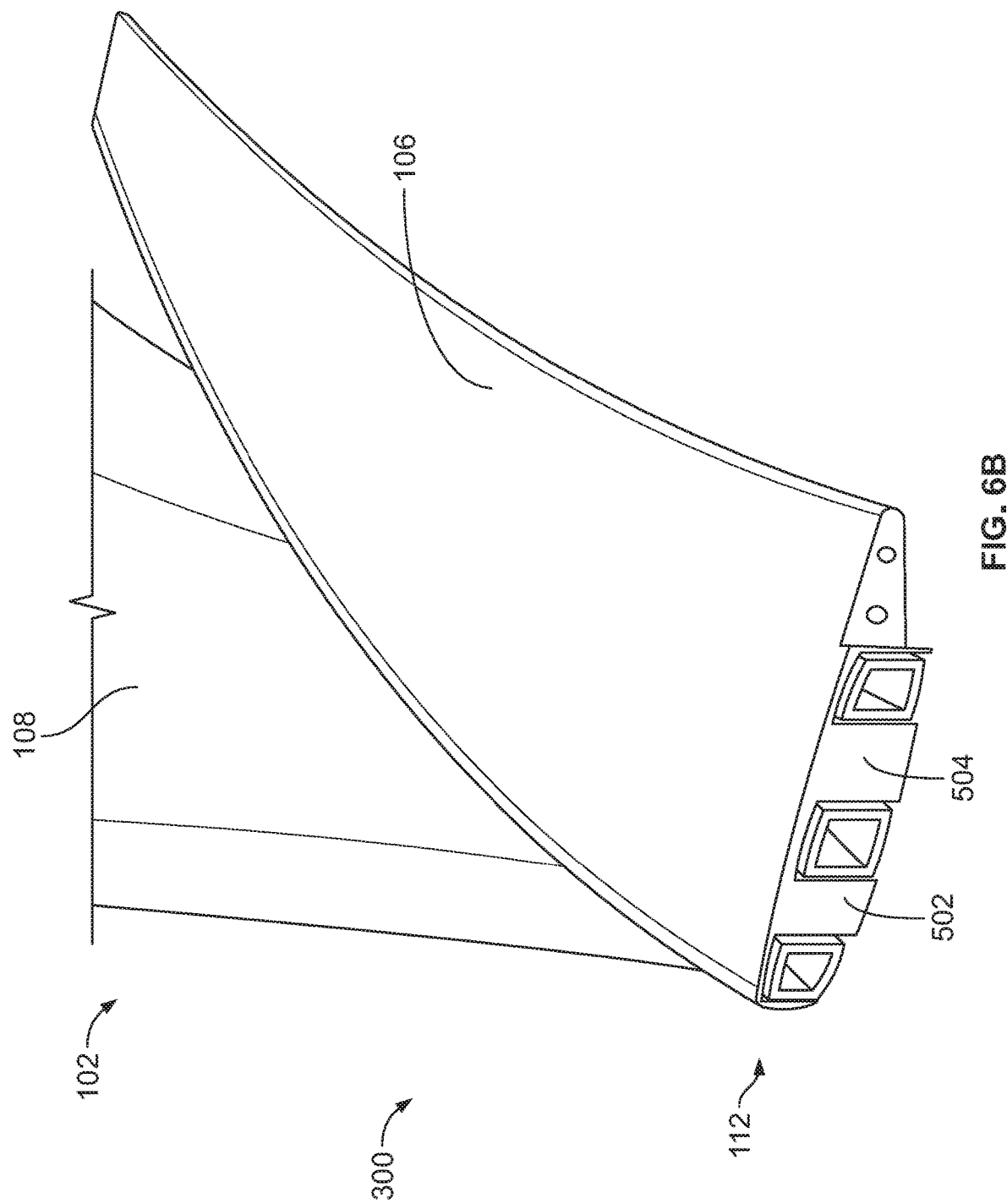

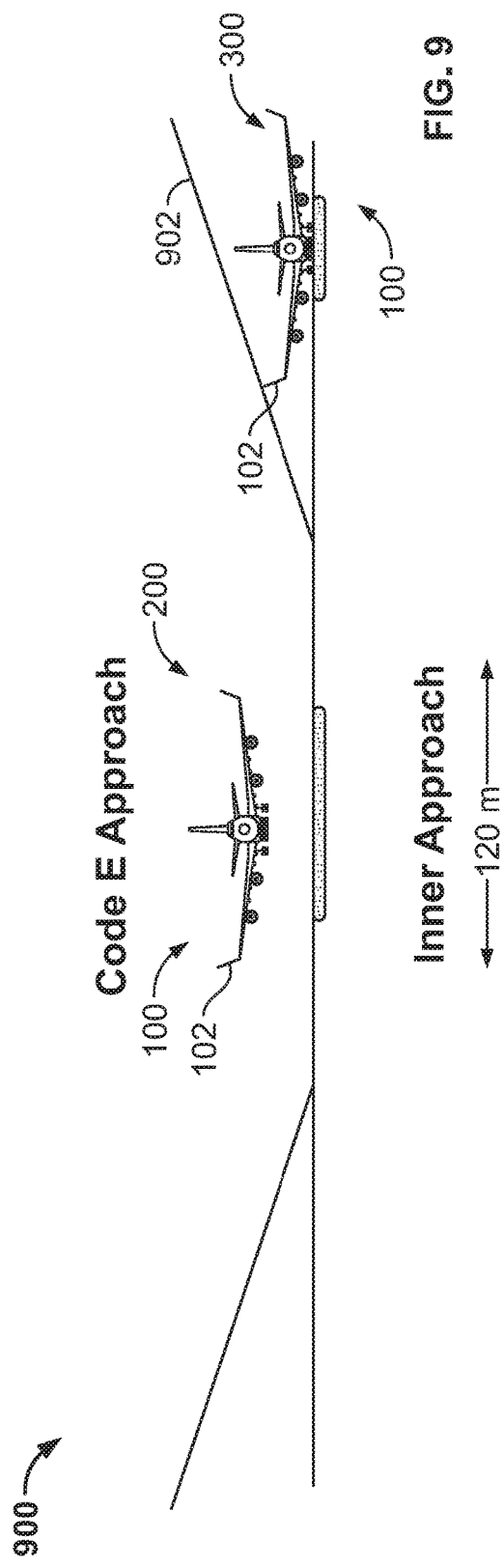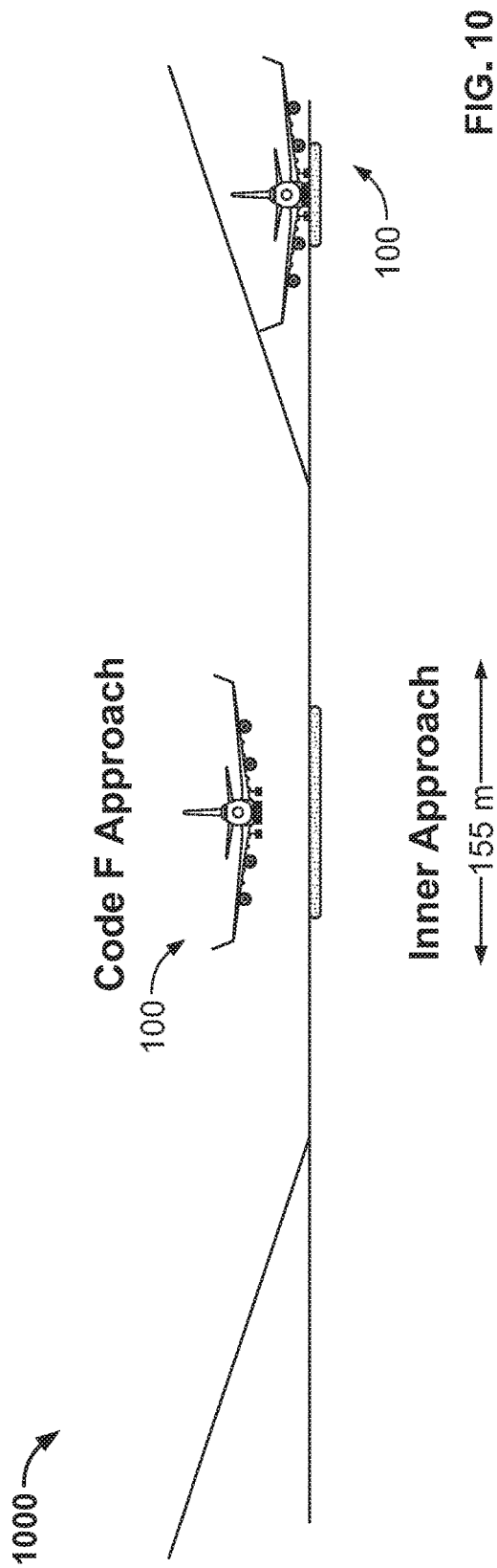

AIRCRAFT HAVING FOLDABLE WINGS

RELATED APPLICATION

This patent claims the benefit of U.S. Provisional Application Ser. No. 62/843,021, which was filed on May 3, 2019, and which is hereby incorporated herein by reference in its entirety.

FIELD

The present disclosure relates generally to aircraft and, more particularly, to aircraft having foldable wings.

BACKGROUND

Long span wings are desirable for commercial aircraft because such wings are more aerodynamically efficient relative to wings having a shorter span. Greater aerodynamic efficiency reduces fuel consumption, which reduces operating costs. However, the wingspan of an aircraft can be constrained based on dimensional limits and/or regulations imposed by the International Civil Aviation Organization (ICAO), and/or based on physical infrastructure limitations of airports (e.g., the relative sizes of runways, taxiways, gate areas, hangars, etc.).

SUMMARY

An example aircraft includes a fixed wing portion, a foldable wing tip, and a hinge interface to pivotally couple the foldable wing tip and the fixed wing portion. The hinge interface has a first hinge defining a hinge axis that is substantially parallel to a fuselage centerline. The first hinge has a first dimension in a spanwise direction and a second dimension in a chordwise direction. The first dimension is greater than the second dimension.

Another example aircraft includes a wing having a fixed wing portion and a foldable wing tip. A hinge interface pivotally couples the foldable wing portion to the fixed wing portion. The hinge interface includes a first wing rib and a second wing rib spaced from the first wing rib to define a first hinge. The first wing rib supports a first hinge pin and the second wing rib to support a second hinge pin. Each of the first wing rib and the second wing rib has a longitudinal axis to extend between the foldable wing tip and the fixed wing portion in a direction substantially perpendicular to a fuselage centerline of the aircraft.

Another example aircraft includes a first wing having a first fixed portion and a first foldable portion and a second wing having a second fixed portion and a second foldable portion. The first wing and the second wing provide a first wingspan when the first foldable portion and the second foldable portion are in extended positions. The first wing and the second wing provide a second wingspan when the first foldable portion and the second foldable portion are in a folded position. The first wingspan is greater than approximately 65 meters and the second wingspan is less than approximately 65 meters, and where each of the first and second foldable portions rotate about a hinge axis that is substantially parallel relative to a fuselage centerline.

The features, functions and advantages that have been discussed can be achieved independently in various examples or may be combined in yet other examples further details of which can be seen with reference to the following description and drawings.

BRIEF DESCRIPTION OF THE DRAWINGS

FIG. 6B is a partial view of the example foldable wing of FIGS. 1-6A.

FIG. 9 is a front view of the example aircraft of FIGS. 1-7 with reference to an ICAO Code E landing clearance limitation.

FIG. 10 is a front view of the example aircraft of FIGS. 1-7 with reference to an ICAO Code F landing clearance limitation.

Figure 1:
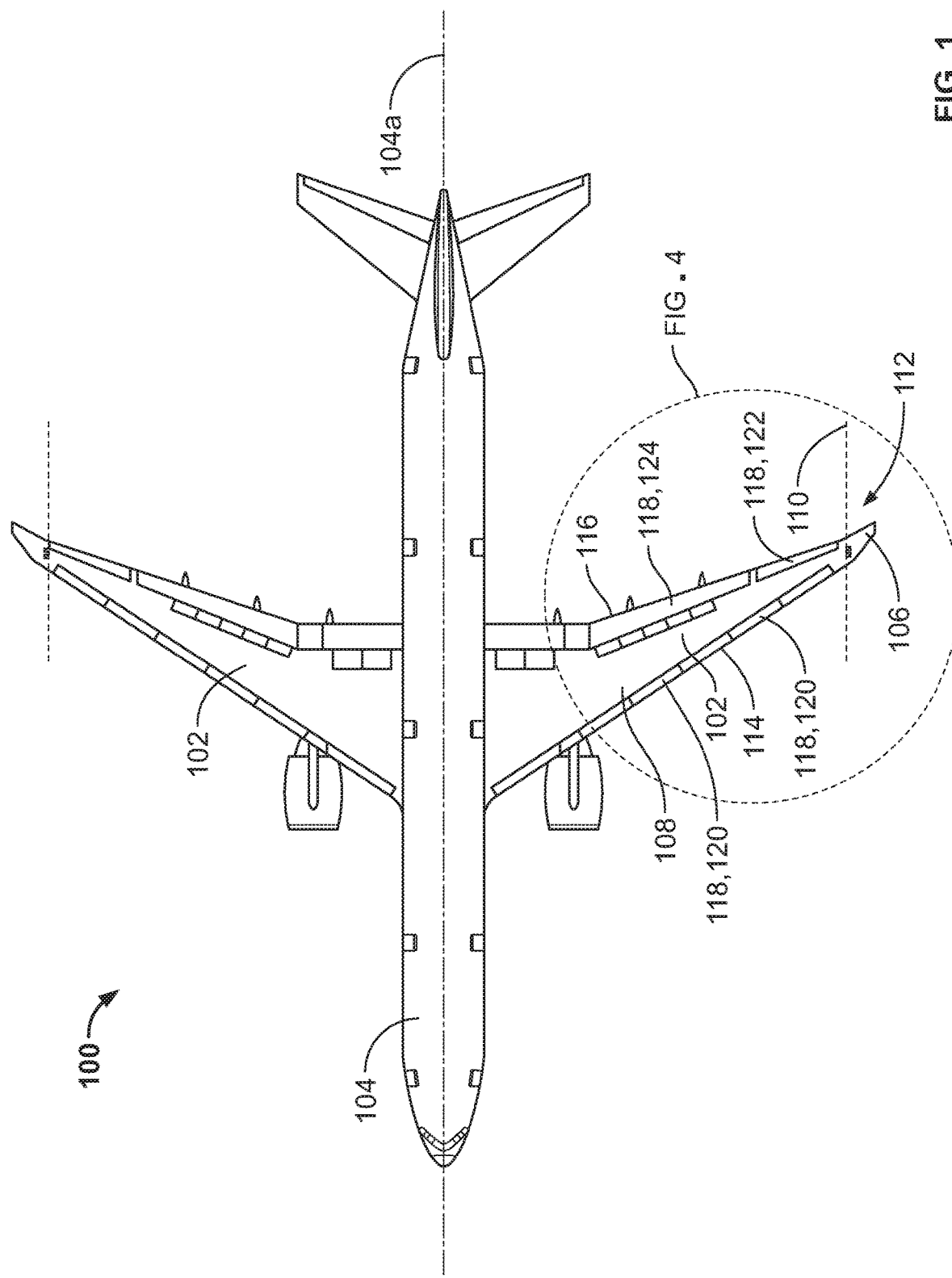
FIG. 1 is a top view of an example aircraft in which aspects of the present disclosure may be implemented.

Wherever possible, the same reference numbers will be used throughout the drawing(s) and accompanying written description to refer to the same or like parts. As used in this disclosure, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DESCRIPTION

Wings having a longer, thinner profile are more aerodynamically efficient than shorter, thicker wings. Likewise, higher aspect ratio wings produce more efficient flight than lower aspect ratio wings. Aircraft wings, for example, may be designed to reduce drag by manipulating an aspect ratio of the wings. The aspect ratio of the aircraft wings is the ratio of the span of the wings to the mean chord of the wings. The span is the distance from one wingtip to the other wingtip. The span is measured in a straight line from wingtip to wingtip, independently of wing shape or sweep. A chord is a reference straight line joining a leading edge and a trailing edge of the aircraft wing. A chord length is a distance between the trailing edge and the point on the leading edge where the chord intersects the leading edge. Most aircraft wings are not rectangular, so they have a different chord and corresponding chord length at different positions along the span of the aircraft wing. In some examples, the mean chord is a standard mean chord (SMC), where the SMC is defined as wing area divided by wing span. In some instances, the mean chord is a mean aerodynamic chord (MAC), where the MAC is calculated using an integral sum of the chord lengths over the wingspan of the aircraft. To increase the aspect ratio of aircraft wings, the wingspan may be increased. Increasing the wingspan is an effective method of increasing the aspect ratio of aircraft wings and reducing drag and/or enhancing lift of the aircraft.

However, elongated wingspans may pose challenges to existing airport layouts. Airport designs are based on International Civil Aviation Organization (ICAO) Codes A through F, which establish dimensional limits on wingspans, landing gear, width, length, etc. Thus, an airport taxiway and/or gate may have space (e.g., width) limitations, which limit a wingspan of an aircraft that may use the taxiway and/or the gate. For instance, an ICAO Code E airport limits wingspan to less than 65 meters so that aircraft can fit within runways, taxiways and/or gate areas. Most airports are designed to accommodate aircraft up to ICAO Code E, which limits wingspans to less than 65 meters so that aircraft can fit through runways, taxiways, gate areas, etc. Example aircraft disclosed herein employ folding wing tips to provide larger wingspans (e.g., greater than 65 meters) during flight and enable the wingspan of the aircraft to be reduced to accommodate the aircraft the airport infrastructure (e.g., parking areas, taxiways, etc.).

Other aircraft wings employ winglets to improve lift or efficiency. However, winglets are often approximately 30 percent longer in length than a tip extension to obtain similar benefits in lift and efficiency as a tip extension. This results in a heavier winglet, which decreases fuel efficiency.

Example aircraft disclosed herein employ a changeable wingspan that can be greater than space limitations of a taxiway and/or a gate and less than the space limitation of a taxiway and/or a gate. For example, aircraft disclosed herein employ wings that can fold to enable the aircraft to fit within the taxiway and/or the gate. Example aircraft with foldable wings disclosed herein allow lower fuel consumption of an airplane having a wingspan greater than 65 meters (m) (213.3 feet) and capable of operating in a code E airport environment where wingspan is limited to 65 m (213.3 feet). In some examples, example aircraft with foldable wings disclosed herein can be employed with aircraft for other coded airport environments where wingspan is limited to less than 60 m, 50 m, 30 m, and/or any other wingspan.

Additionally, example foldable wings disclosed herein include an actuation system to enable a folding action of the wing. Specifically, the actuation system employs a hinge located outboard of an aileron of the foldable wing. As a result, none of the hydraulic or electrical systems of the actuation system traverse or cross over the hinge into a foldable wing tip. The added weight of hinge system is offset by the fuel savings from the longer and more efficient wing. For example, example aircraft having example folding wings disclosed herein provide a reduction in fuel consumption of 3% to 5%. Further, foldable wings disclosed herein are more weight efficiency than winglets.

FIG. 1 is a top view of an aircraft 100 in which aspects of the present disclosure may be implemented. The aircraft 100 of FIG. 1 includes foldable wings 102 (e.g., a first wing and a second wing) that extend from a fuselage 104. A fuselage centerline 104a is used herein as a reference for certain dimensional characteristics of the foldable wings 102. The aircraft 100 of the illustrated example is a commercial aircraft. In some examples, the foldable wings 102 disclosed herein can be implemented with any other example aircraft such as, for example, military aircraft, transport aircraft and/or any other suitable aircraft.

The foldable wings 102 of the aircraft 100 are identical in structure and function. Therefore, only one of the foldable wings 102 of the aircraft 100 will be discussed in detail for simplicity and brevity. The foldable wing 102 includes a folding wing tip 106 (e.g., a foldable portion) and a fixed wing portion 108 (e.g., a fixed or non-movable portion). The folding wing tip 106 is a foldable outboard section of the foldable wing 102. The fixed wing portion 108 is a fixed inboard section of the foldable wing 102. The fixed wing portion 108 of the foldable wing 102 is fixedly and/or rigidly coupled (e.g., directly or indirectly) to the fuselage 104 of the aircraft 100. The folding wing tip 106 of the foldable wing 102 is rotatable and/or foldable relative to the fixed wing portion 108 of the foldable wing 102. Rotation and/or folding of the folding wing tip 106 relative to the fixed wing portion 108 occurs about an example hinge line or hinge axis 110 defined by a hinge interface 112. The foldable wing 102 includes a leading edge 114 and a trailing edge 116. Each of the foldable wings 102 includes control surfaces 118 (e.g., aerodynamic surfaces, auxiliary airfoils, etc.) adjacent the leading edge and the trailing edge 116 that may be displaced or extended to change the aerodynamic lift of the aircraft 100 during takeoff or landing, for example. The control surfaces 118 include leading edge slats 120, ailerons 122, flaps 124, spoilers, etc.

Figure 2:
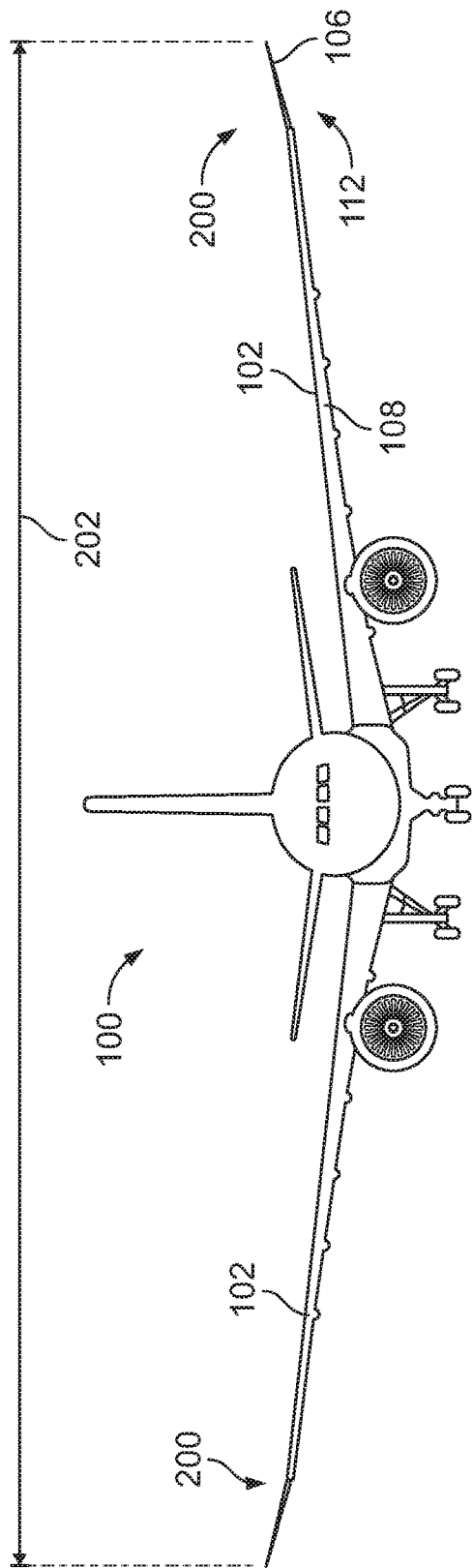
FIG. 2 is a front view of the example aircraft of FIG. 1 showing example foldable wings of the example aircraft in an example unfolded position.

FIG. 2 is a front view of the aircraft 100 of FIG. 1 showing each of the foldable wings 102 of FIG. 1 in an example unfolded position 200 (e.g., a deployed position, an extended position, a spread position, a flight position, etc.). In the unfolded position 200, the aircraft 100 of the illustrated example has a first wingspan 202. For example, the first wingspan 202 can be approximately between 60 meters (196.85 feet) and 80 meters (262.47 feet). In some examples, the first wingspan is approximately 72 meters (236.22 feet). In some examples, the foldable wings 102 can accommodate smaller sized aircraft. In some examples, the first wingspan 202 can be approximately between 32 meters (104.97 feet) and 60 meters (196.85 feet). In some such examples, the first wingspan is approximately 35.9 meters (117.78 feet). As used herein, "approximately" means the example value provided is identical to the value stated or within a tolerance (e.g., within a ten percent tolerance). In other examples, the first wingspan 202 can be less than approximately 65 meters or greater than approximately 80 meters. In the unfolded position 200, the folding wing tip 106 is an extension of the fixed wing portion 108. Thus, the fixed wing portion 108 and the folding wing tip 106 each provide a substantially continuous airfoil and the hinge interface 112 does not interfere or affect aerodynamic characteristic(s) or performance of the foldable wing 102.

Figure 3:
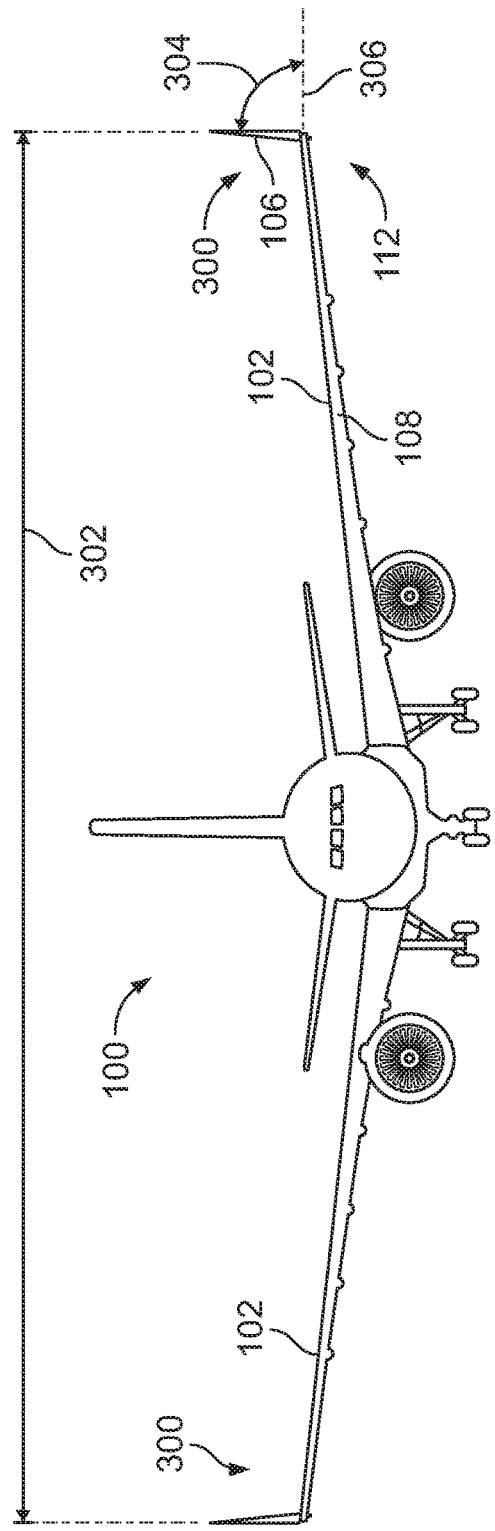
FIG. 3 is a front view of the example aircraft of FIG. 1 showing the example foldable wings of the example aircraft in an example folded position.

FIG. 3 is a front view of the aircraft 100 of FIG. 1 showing each of the foldable wings 102 of FIG. 1 in an example folded position 300 (e.g., a stowed position, a stored position, etc.). In the folded position 300, the aircraft 100 of the illustrated example has a second wingspan 302 different (e.g., less) than the first wingspan 202. For example, the second wingspan 302 can be approximately between 55 meters and 65 meters. For example, the second wingspan 302 can be approximately 65 meters (213.25 feet). In other examples, the second wingspan 302 can be less than 60 meters. For example, the second wingspan 302 can be approximately between 25 meters and 36 meters. To achieve the folded position 300, the folding wing tip 106 of the foldable wing 102 is rotated upward relative to the fixed wing portion 108 via the hinge interface 112. The folding wing tip 106 is positioned at an angle 304 relative to a horizontal reference 306 when the folding wing tip 106 is in the folded position 300 of FIG. 3. The angle 304 can be between approximately eighty degrees and one-hundred and five degrees relative to the horizontal reference 306. In other examples, the angle 304 between the folding wing tip 106 and the fixed wing portion 108 may be less than or greater than eighty degrees (e.g., ninety degrees, forty-five degrees, one hundred thirty-five degrees, etc.) when the folding wing tip 106 is in the folded position 300. In some examples, the folding wing tip 106 is oriented substantially vertically relative to the fixed wing portion 108. In other examples, to achieve the folded position 300, the folding wing tip 106 can be rotated downward relative to the fixed wing portion 108. The varying wingspans (e.g., the first wingspan 202 and the second wingspan 302) enable improved performance during flight, while enabling the aircraft 100 to meet certain airport limitations. For example, a larger wingspan employed during flight significantly improves fuel efficiency, thereby improving aircraft performance.

Figure 4:
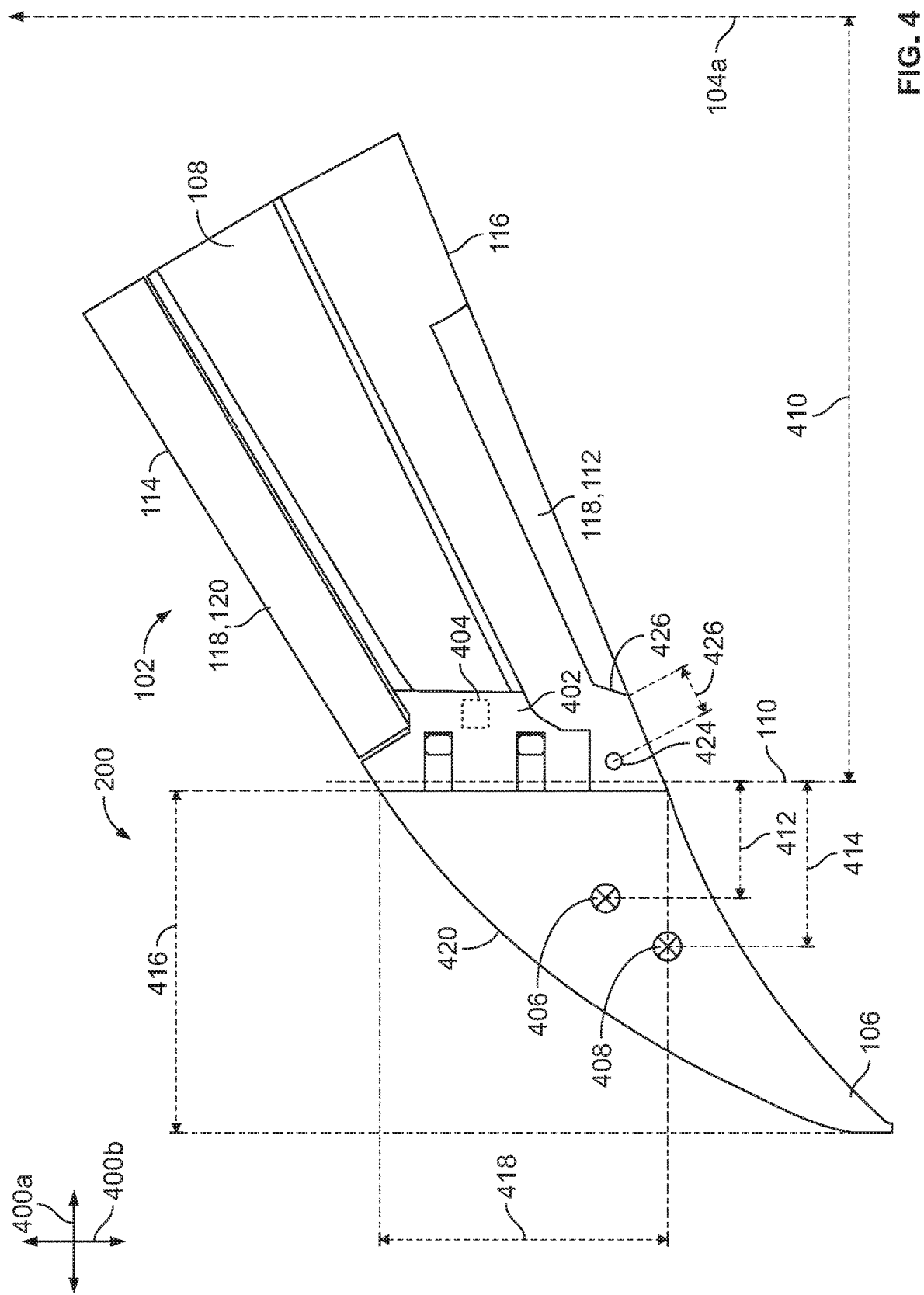
FIG. 4 is an enlarged, partially assembled view of an example first foldable wing of FIGS. 1-3 shown in the example unfolded position.

FIG. 4 is an enlarged, partially assembled view of the foldable wing 102 of FIGS. 1-3 in the unfolded position 200. The hinge interface 112 provides a transition 402 that pivotally couples the folding wing tip 106 to the fixed wing portion 108 about the hinge axis 110. Specifically, the hinge axis 110 is provided between the folding wing tip 106 and an outermost one of the control surfaces 118 (e.g., the leading edge slat 120) positioned on the leading edge of the fixed wing portion 108 and an outermost one of the control surfaces 118 (e.g., the aileron 122) located at the trailing edge 116 of the fixed wing portion 108.

To move or transition the folding wing tip 106 between the extended position 200 and the folded position 300, the aircraft 100 includes a folding wing tip actuation system 404. In general, loads (e.g., external loads, moment loads, torsion loads, airloads, etc.) acting upon the folding wing tip 106 include a weight of the folding wing tip 106, dynamic effects of moving a mass of the folding wing tip 106, and airloads (e.g., aerodynamic forces) acting upon the folding wing tip 106. The folding wing tip actuation system 404 is designed (e.g., sized) based on power requirements needed to rotate or lift the folding wing tip 106 and/or to maintain the folding wing tip 106 in the folded position 300 against these (and/or other) adverse forces. To reduce (e.g., minimize) loads (e.g., airloads, hinge moments, etc.) imparted to the folding wing tip 106 and/or the hinge interface 112 and, thus, power requirements needed to operate the folding wing tip 106, a location of the hinge axis 110 of the illustrated example is positioned relative to a center of mass 406 and a center of airloading 408 of the folding wing tip 106. Specifically, the center of mass 406 and the center of airloading 408 are positioned or located near (e.g., adjacent) the hinge axis 110 to reduce (e.g., minimize) loads (e.g., lift loads, aerodynamic loads, etc.).

For example, the hinge interface 112 defines the hinge axis 110 at a distance 410 from the fuselage centerline 104a of the fuselage 104 (e.g., a dimensional length in a spanwise direction 400a). The distance 410 can be approximately between 60 meters (98.42 feet) and 65 meters (106.62 feet). For example, the distance 410 is approximately 62.5 meters (106.62 feet). The center of mass 406 of the folding wing tip 106 is located at a distance 412 from the hinge axis 110 (e.g., in the spanwise direction 400a). In some examples, the distance 412 can be approximately between 0.40 meters (1.31 feet) and 0.80 meters (2.62 feet). For example, the distance 412 is approximately 0.60 meters (2.0 feet). Additionally, the center of airloading 408 (e.g., a center of pressure) is located at a distance 414 from the hinge axis 110. In some examples, the distance 414 can be approximately between 0.9 meters (2.9 feet) and 1.5 meters (4.9 feet). For example, the distance 414 is approximately 0.8 meters (2.5 feet). In some examples, the distance 414 and/or the distance 412 can be determined as a function (e.g., a percentage) of a semi-span length 416 and/or a folding wing tip chord length 418.

Varying the distance 412 between the center of mass 406 and the hinge axis 110 and/or the distance 414 between the center of airloading 408 and the hinge axis 110 varies (e.g., reduces or increases) loads imparted to the folding wing tip 106 and, thus, varies (e.g., increases or decreases) power requirements for lifting the folding wing tip 106 and/or reacting loads imparted to the folding wing tip 106. For example, increasing the distance 412 between the hinge axis 110 and the center of mass 406 and/or the distance 414 between the center of airloading 408 and the hinge axis 110 increases loads (e.g., mass loads, air loads, etc.) imparted to the hinge interface 112 during operation. Likewise, reducing the distance 412 between the hinge axis 110 and the center of mass 406 and/or the distance 414 between the center of airloading 408 and the hinge axis 110 decreases loads imparted to the hinge interface 112 and, thus, reduces power requirements for rotating or lifting the folding wing tip 106 between the extended position 200 and the folded position 300 and/or the power requirements for maintaining or holding the folding wing tip 106 in the folded position 300.

The foldable wing 102 of the illustrated example has a semi-span length 416 (e.g., in the spanwise direction 400a) and a folding wing tip chord length 418 (e.g., in the chordwise direction 400b). Specifically, the semi-span length 416 can be approximately between 3.05 meters (10 feet) and 4.27 meters (14 feet). For example, the semi-span length 416 can be approximately 3.66 meters (12 feet). The folding wing tip chord length 418 can be approximately between 2.54 meters (8.33 feet) and 3.35 meters (11 feet). For example, the folding wing tip chord length 418 can be approximately 3.04 meters (10 feet).

The folding wing tip 106 of the illustrated example exhibits a raked shape and/or overall geometry. The raked wingtip enhances aerodynamics, thereby increasing fuel efficiency and reducing costs. The folding wing tip 106 includes a leading edge 420 having a curved profile (e.g., a swept profile). The swept angle can be approximately between 50 degrees and 60 degrees relative to orthogonal (e.g., a reference perpendicular to the fuselage centerline 104a). For example, the foldable wing tip is an aft swept raked tip. The parameters described herein can be related to the example wing tip or other aerodynamic features and/or components described herein.

To this end, due to a radius of curvature of a leading edge 420 of the folding wing tip 106, the folding wing tip 106 does not require movable control surfaces (e.g., leading edge slats) to prevent airflow separation at high angles of attack that can induce aircraft stall. Providing the folding wing tip 106 without moving control surfaces enables formation of the foldable wing 102 without motive equipment (e.g., motors, hydraulic systems, etc.) to span across the hinge axis 110 and/or the hinge interface 112 that may otherwise be needed to deploy or move the control surfaces of a wing tip. To this end, locating or positioning the hinge axis 110 between a curved portion of the leading edge 420 and the control surface 118 of the fixed wing portion 108 of the foldable wing 102 significantly reduces complexity of the hinge interface 112 because the folding wing tip 106 can be formed without movable control surfaces (e.g., the control surfaces 118, a slat, etc.). Additionally, the hinge axis 110 is positioned outboard of the aileron 122 to enable fuel jettison from a port 424 of the foldable wing 102. Here, the port 424 is positioned a distance approximately between 0.25 feet and 1.00 feet from an end 426 of the control surface 118 of the trailing edge 116 of the fixed wing portion 108. In other examples, the folding wing tip 106 can be a straight wing tip (e.g., a non-raked wing tip). In some examples where the folding wing tip 106 has a straight profile, the folding wing tip 106 can include movable control surfaces to protect against aircraft stall. In some such examples, at least a portion of a control system (e.g., a motor, a hydraulic system, etc.) can be in the folding wing tip 106.

Additionally, due to the raked folding wing tip 106, the location of the hinge axis 110 can positioned at the distance 410 from the fuselage centerline 104a that enables the transition 402 to provide a housing for aircraft components. For example, the transition 402 and/or the fixed wing portion 108 provides can house the folding wing tip actuation system 404 that can include one or more actuators, transmissions and/or drives. Additionally, the transition 402 and/or the fixed wing portion 108 accommodates drive components (e.g., motors, hydraulic systems, drive shafts, transmissions, etc.) that operate the control surfaces 118 (e.g., the slats, the aileron) of the fixed wing portion 108. In this manner, no component (e.g., drive systems, etc.) of the folding wing tip actuation system 404 and/or components of the control surfaces 118 traverses the hinge interface 112 and/or is positioned or located (e.g., housed) in the folding wing tip 106. In some examples, a wire or cable (e.g., a wire bundle) can traverse the hinge interface 112 to electrically couple to a light (e.g., a tip light) supported by the folding wing tip 106.

Figure 5:
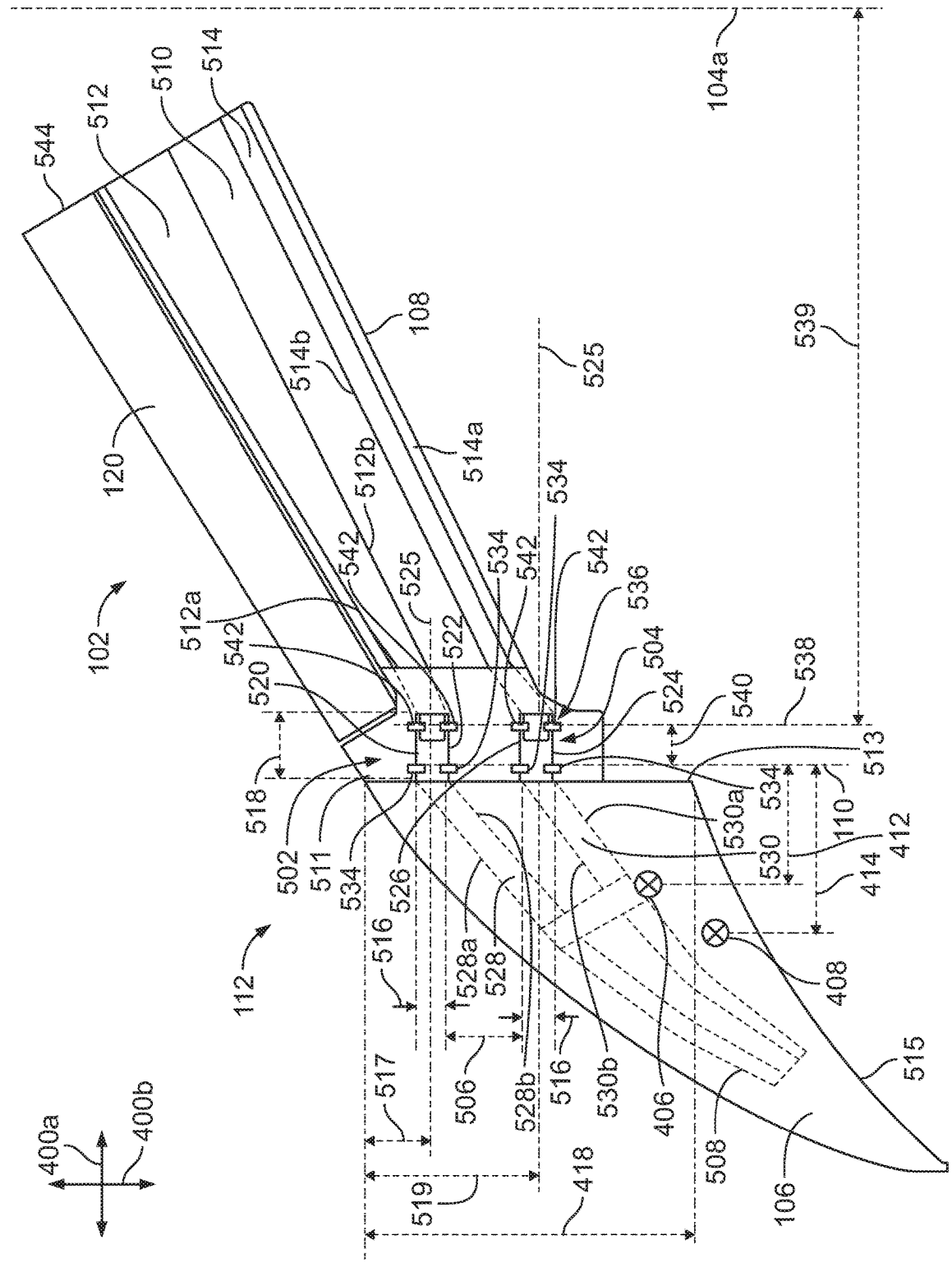
FIG. 5 is a partially, assembled view of the example foldable wing of FIGS. 1-4.

FIG. 5 is a partially, assembled view of the foldable wing 102 of FIGS. 1-4. To enable the folding wing tip 106 to pivot or rotate relative to the fixed wing portion 108, the hinge interface 112 includes one or more hinges. For example, the hinge interface 112 includes a first hinge 502 (e.g., a fore hinge) and a second hinge 504 (e.g., an aft hinge). However, in some examples, the hinge interface 112 includes only one hinge (e.g., the second hinge 504) or more than two hinges (e.g., three hinges, four hinges, etc.). The first hinge 502 and the second hinge 504 are located along the folding wing tip chord length 418 and the first hinge 502 is spaced relative to the second hinge 504 in the chordwise direction 400b (e.g., in the fore-aft direction). Specifically, the first hinge 502 is spaced horizontally relative to the second hinge 504 in the fore-aft direction (e.g., chordwise direction 400b). For example, the first hinge 502 is spaced from the second hinge 504 a distance 506 of approximately between 0.8 meters (2.6 feet and 1.0 meters (3.3 feet). For example, the distance 506 is approximately 0.86 meters (2.83 feet).

The first hinge 502 and the second hinge 504 are coupled to and/or extend from the folding wing tip 106 toward the fixed wing portion 108. For example, the first hinge 502 and the second hinge 504 are coupled to a tip wing box 508 of the folding wing tip 106 and a fixed wing box 510 of the fixed wing portion 108. For example, the first hinge 502 and the second hinge 504 can be coupled to a closeout wing rib of the tip wing box 508 and a front spar 512 and/or a rear spar 514 of the fixed wing box 510. The first hinge 502 is positioned or located near (e.g., adjacent) a leading-edge interface 511 (e.g., an intersection) between the leading edge 420 of the folding wing tip 106 and the folding wing tip chord length 418. The second hinge 504 is positioned or located between the first hinge 502 and a trailing-edge interface 513 (e.g., an intersection) between a trailing edge 515 of the folding wing tip 106 and the folding wing tip chord length 418. For example, the first hinge 502 is spaced from the leading-edge interface 511 a distance 517 of approximately between 0.4 meters (1.3 feet) and 0.7 meters (2.3 feet). For example, the distance 517 is approximately 0.5 meters (1.6 feet). In this example, the distance 517 is measured between the leading-edge interface 511 and a center (e.g., a longitudinal axis 525) of the first hinge 502. The second hinge 504 is positioned aft of the first hinge 502. For example, the second hinge 504 is positioned or located at a midpoint of the folding wing tip chord length 418. In some examples, the first hinge 502 is spaced from the leading-edge interface 511 a distance 519 of approximately between 1.0 meters (3.3 feet) and 1.8 meters (5.9 feet). For example, the distance 519 is approximately 1.4 meters (4.6 feet). In this example, the distance 519 is measured between the leading-edge interface 511 and a center (e.g., a longitudinal axis 525) of the second hinge 504. Thus, the second hinge 504 is located at or adjacent (e.g., within 10% of) a midpoint of the folding wing tip chord length 418 and the first hinge 502 is positioned fore of the second hinge 504 in the chordwise direction 400b by any desired distance. In some examples, the second hinge 504 can be positioned at any location between the leading edge 420 and a trailing edge 515 of the folding wing tip 106 (e.g., along the folding wing tip chord length 418). In some examples, the first hinge 502 can be positioned adjacent or at the midpoint of the folding wing tip chord length 418 or at any other location between the leading edge 420 and a trailing edge 515 of the folding wing tip 106 (e.g., along the folding wing tip chord length 418). In some such examples where the first hinge 502 is positioned adjacent or at the midpoint, the second hinge 504 can be located aft of the first hinge 502 in the chordwise direction 400b by any desired distance.

The folding wing tip 106 imparts loads (moment loads, torsion loads, etc.) to the fixed wing portion 108. To react the loads, the first hinge 502 of the illustrated example provides a first torque box and the second hinge 504 provides a second torque box. Each of the first hinge 502 and the second hinge 504 has a dimensional length 518 (e.g., a first dimension) in the spanwise direction 400a and a dimensional width 516 (e.g., a second dimension) in the chordwise direction 400b. For example, the dimensional length 518 (e.g., a torque box length) of each of the first hinge 502 and the second hinge 504 is approximately between 0.4 meters (1.3 feet) and 0.6 meters (2.0 feet). For example, the dimensional length 518 is 0.51 meters (1.67 feet). Each of the first hinge 502 and the second hinge 504 has the dimensional width 516 (e.g., a dimensional width, a torque box width) of approximately between 0.20 meters (0.67 feet) and 0.30 meters (1.00 feet). For example, the dimensional width 516 is 0.25 meters (0.83 feet).

To provide the first and second torque boxes, the first hinge 502 and the second hinge 504 can be formed by a plurality of ribs (e.g., wing ribs), chords, and/or other wing frame structure(s). For example, the first hinge 502 includes a first wing rib 520 and a second wing rib 522 defining the first torque box. The second hinge 504 of the illustrated example includes a third wing rib 524 and a fourth wing rib 526 defining the second torque box. The first wing rib 520 is spaced from the second wing rib 522 to define the dimensional width 516 of the first hinge 502 and the third wing rib 524 is spaced from the fourth wing rib 526 to define the dimensional width 516 of the second hinge 504. Each of the first, second, third and fourth wing ribs 520-526 at least partially spans across the hinge interface 112 between the folding wing tip 106 and the fixed wing portion 108. For example, the wing ribs 520-526 span across the hinge interface 112 with the dimensional length 518 in the spanwise direction 400a (e.g., the dimensional length 518) that is greater than the dimensional width 516 in which the wing ribs 520-526 extend in the chordwise direction 400b. As a result, the dimensional length 518 is greater than the dimensional width 516. In other words, the wing ribs 520-526 extend from the folding wing tip 106 in a direction that is substantially perpendicular to the fuselage centerline 104a of the fuselage 104. Specifically, each of the wing ribs 520-526 has a longitudinal axis 525 that extends between the folding wing tip 106 and the fixed wing portion 108 in a direction substantially perpendicular to the fuselage centerline 104a of the aircraft 100. As used herein, substantially perpendicular means either perfectly perpendicular (e.g., exactly ninety degrees) or almost perpendicular (e.g., within a certain percentage of perfectly perpendicular, within 10% of perpendicularity).

To enable the hinge interface 112 to provide a (e.g., primary) load path to transfer loads and/or forces from the folding wing tip 106 to the fixed wing portion 108, the first hinge 502 and the second hinge 504 are coupled to the tip wing box 508 of the folding wing tip 106 and the fixed wing box 510 of the fixed wing portion 108. The first hinge 502 is coupled to the front spar 512 of the fixed wing box 510 and the second hinge 504 is coupled to the rear spar 514 of the fixed wing box 510. Likewise, the first hinge 502 is coupled to a front spar 528 of the tip wing box 508 and the second hinge 504 is coupled to a rear spar 530 of the tip wing box 508.

Specifically, the first wing rib 520 is coupled (e.g., attached indirectly or directly) to a first side or structure 512a of the front spar 512 of the fixed wing box 510 and a first side or structure 528a of the front spar 528 of the tip wing box 508. The second wing rib 522 is coupled (e.g., attached indirectly or directly) to a second side or structure 512b (e.g., a closeout rib) of the fixed wing box 510 and a second side or structure 528b (e.g., a closeout rib) of the tip wing box 508. Likewise, the third wing rib 524 is coupled (e.g., attached indirectly or directly) to a first side or structure 514a of the rear spar 514 of the fixed wing box 510 and a first side or structure 530a of the rear spar 530 of the tip wing box 508. The fourth wing rib 526 is coupled (e.g., attached indirectly or directly) to a second side or structure 514b (e.g., a closeout rib) of the fixed wing box 510 and a second side or structure 530b (e.g., a closeout rib) of the tip wing box 508. The first hinge 502 (e.g., the first wing rib 520 and the second wing rib 522) is in a non-parallel or a non-perpendicular orientation relative to the front spar 512 of the fixed wing box 510. The first hinge 502 (e.g., the first and second wing ribs 520-522) is positioned at an angle (between zero degrees and ninety degrees) relative to the front spar 512. The second hinge 504 (e.g., the third wing rib 524 and the fourth wing rib 526) is in a non-parallel or a non-perpendicular orientation relative to the rear spar 514 of the fixed wing box 510. The second hinge 504 (e.g., the third wing rib 524 and the fourth wing rib 526) is positioned at an angle (between zero degrees and ninety degrees) relative to the rear spar 514.

To enable rotation (e.g., pivotal movement) of the folding wing tip 106 and the fixed wing portion 108, the hinge interface 112 of the foldable wing includes a plurality of hinge pins 534. Respective ones of the hinge pins 534 are coupled to or supported by respective ones of the wing ribs 520-526. Thus, the hinge pins 534 are supported by the wing ribs 520-526. For example, each of the first, second, third and fourth wing ribs 520-526 includes a hinge pin aperture that aligns along the hinge axis 110 to receive or support respective ones of the hinge pins 534. In some examples, a unitary hinge pin is provided that is coupled to or supported by at least one of the wing ribs 520-526. Thus, the hinge axis 110 passes through the first wing rib 520, the second wing rib 522, the third wing rib 524, and the fourth wing rib 526.

To prevent rotation (e.g., lock rotation) of the folding wing tip 106 relative to the fixed wing portion 108, the hinge interface 112 of the foldable wing 102 includes a latch interface 536. The latch interface 536 includes a plurality of latch pins 542. Each of the wing ribs 520-526 includes a latch pin aperture that aligns along a latch axis 538 to receive respective ones of the latch pins 542. In some examples, the latch interface 536 includes one latch pin, two latch pins or any other number of hinge pins (e.g., 3, 4, 5, 6, etc.). The latch pins 542 are movable between a latched position to prevent rotation of the folding wing tip 106 relative to the fixed wing portion 108 and an unlatched position to enable rotation of the folding wing tip 106 relative to the fixed wing portion 108. For example, in the latched position, the latch pins 542 engage respective ones of the wing ribs 520-526 to prevent rotation of the folding wing tip 106. In the unlatched position, the latch pins 542 release or move away from the respective ones of the wing ribs 520-526 to allow rotation of the folding wing tip 106. To move the latch pins between the latched and unlatched position, the foldable wing 102 includes a plurality of actuators. Respective ones of the actuators move respective ones of the latch pins 542 between the latched and unlatched positions.

The latch axis 538 is offset (e.g., laterally offset) relative to the hinge axis 110. For example, the latch axis 538 is spaced from the hinge axis 110 a distance 540 approximately between 0.25 meters (0.83 feet) and 0.40 meters (1.31 feet). For example, the distance 540 can be approximately 0.32 meters (1.05 feet). The latch axis 538 is located from the fuselage centerline 104a a distance 539 of approximately between 32.0 meters (105.0 feet) and 32.2 meters (105.6 feet). Additionally, the latch axis 538 is substantially parallel relative to the hinge axis 110 and/or the fuselage centerline 104a. As used herein, substantially parallel means perfectly parallel or almost perfectly parallel (e.g., within 10 degrees of perfectly parallel). For example, the hinge axis 110 and the latch axis 538 extend in (e.g., are parallel relative to) a fore-aft direction of the aircraft 100 (e.g., a direction of flight). In this manner, the folding wing tip 106 can be oriented to reduce (minimize) air loads imparted to the folding wing tip 106 when in the folded position 300. However, in some examples, the hinge axis 110 and/or the latch axis 538 can be positioned at an angle relative to the fore-aft direction (e.g., the fuselage centerline 104a). For example, the hinge axis 110 and/or the latch axis 538 can be positioned parallel relative to a lateral inboard edge 544 of the fixed wing portion 108. In some examples, the hinge axis 110 and/or the latch axis 538 can have any other angle and/or orientation relative to the fore-aft direction and/or the spanwise direction 400a. In some examples, the hinge axis 110 is not parallel relative to the latch axis 538.

Additionally, the hinge axis 110 is positioned outboard relative to the latch axis 538. For example, the latch axis 538 is positioned closer to fuselage centerline 104a than the hinge axis 110. In other words, the hinge axis 110 is located between the folding wing tip 106 and the latch axis 538, and the latch axis 538 is located between the fixed wing portion 108 and the hinge axis 110. The location of the hinge axis 110 outboard of the latch axis 538 reduces the distance 412 between the center of mass 406 and the hinge axis 110 and the distance 414 between the center of airloading 408 and the hinge axis 110, thereby reducing (e.g., minimizing) a lifting load needed to move the folding wing tip 106 between the extended position 200 and the folded position 300.

FIG. 6 is an enlarged view of the foldable wing 102 of FIG. 5. As noted above, the hinge interface 112 provides a (e.g. primary) load path 600 to transfer a load from the folding wing tip 106 to the fixed wing portion 108 (e.g., to the fixed wing box 510). For example, the hinge interface 112 provides a (e.g., primary) wing bending/spanwise load path and a stream/chord wise stiffening load path. To this end, the hinge interface 112 utilizes the wing ribs 520-526 to transmit loads across the hinge interface 112. For example, the hinge interface 112 provides load paths from the tip wing box 508 to the fixed wing box 510. In some examples, each of the wing ribs 520-526 can transfer the loads across the hinge interface 112, thereby providing a fail-safe system. In this manner if one of the wing ribs 520-526 becomes damaged (e.g., the first wing rib 520 becomes damaged) and cannot transfer loads, the other ones of the wing ribs 520-526 (e.g., the second wing rib 522, the third wing rib 524, the fourth wing rib 526) provide the load path 600 to distribute and transfer the loads to the fixed wing box 510. Additionally, the hinge interface 112 utilizes the hinge pin 534 and the latch pins 542 to react loads across the hinge interface 112 and the latch interface 536. Employing two or more hinges significantly improves the structural integrity of the hinge interface 112. For example, failure of one hinge enables the other ones of the hinges to take-up the loads. Thus, the hinge interface 112 employing the first hinge 502 and the second hinge 504 is configured to provide redundant, fail-safe load paths. However, in some examples, the hinge interface 112 can be configured with only one hinge to pivotally couple the folding wing tip 106 to the fixed wing portion 108. In some examples, the single hinge can be positioned at a midpoint of the folding wing tip chord length 418. In some examples, the single hinge can be positioned at any location between the leading edge 420 and a trailing edge 602 of the folding wing tip 106 (e.g., along the folding wing tip chord length 418).

Figure 6A:
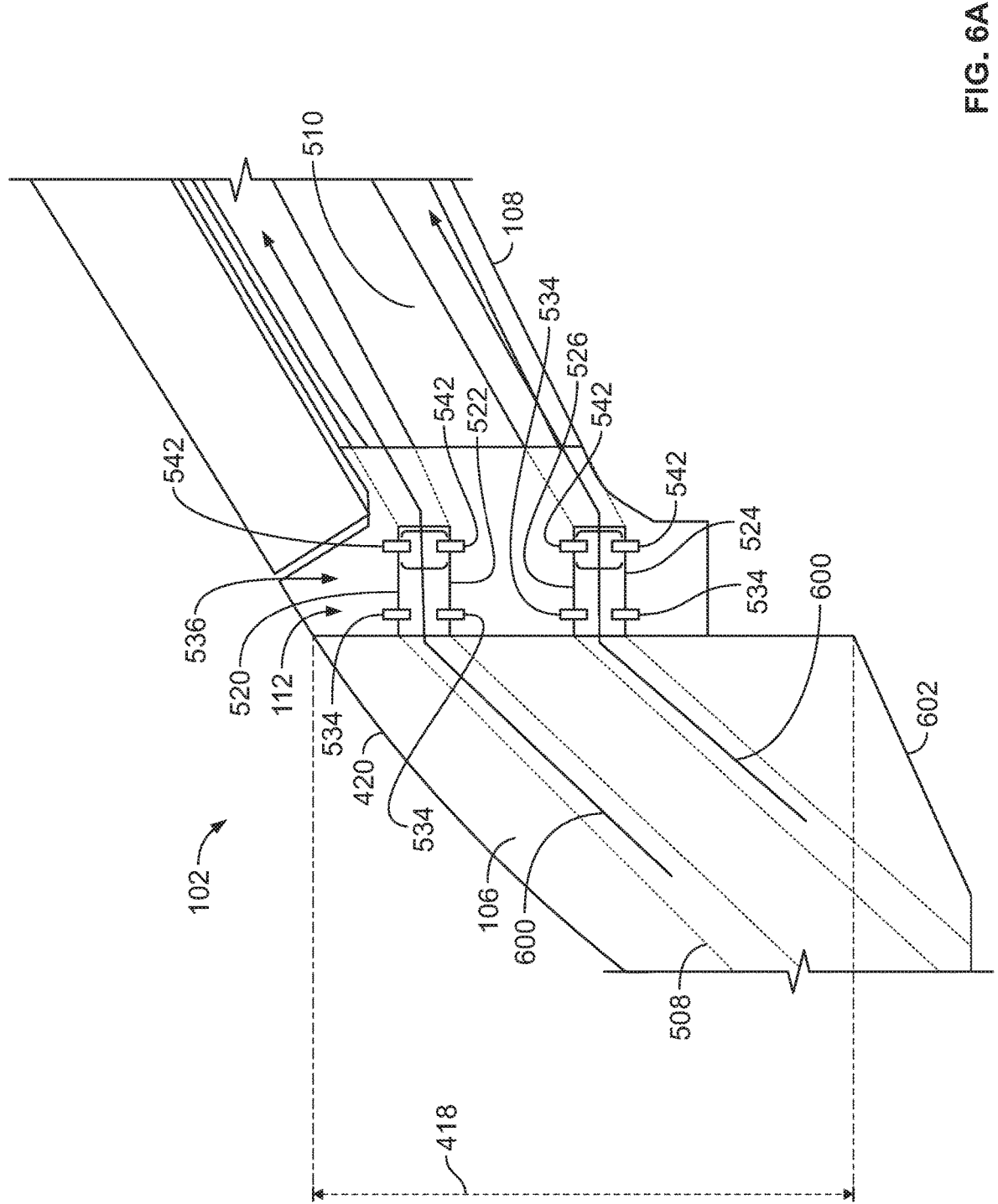
FIG. 6A is an enlarged view of the example foldable wing of FIG. 5.

FIG. 6B is a partial view of the foldable wing 102 of FIGS. 1-6A shown in the folded position 300. The hinge interface 112 facilitates inspection of the structural components associated with the hinge interface 112. For example, in the folded position 300, the folding wing tip 106 exposes or enables access to at least some portions of the first hinge 502 and the second hinge 504 (e.g., the wing ribs 520-526 and/or other wing ribs, chords, or other structure adjacent the hinge axis 110). Such configuration enables visual inspection of the hinge interface 112 (e.g., given that some of the components are at least partially exposed when the folding wing tip 106 is in the folded position 300). Such configuration significantly reduces maintenance time needed to inspect the hinge axis 110 and, thus, reduces maintenance costs.

Figure 7A:
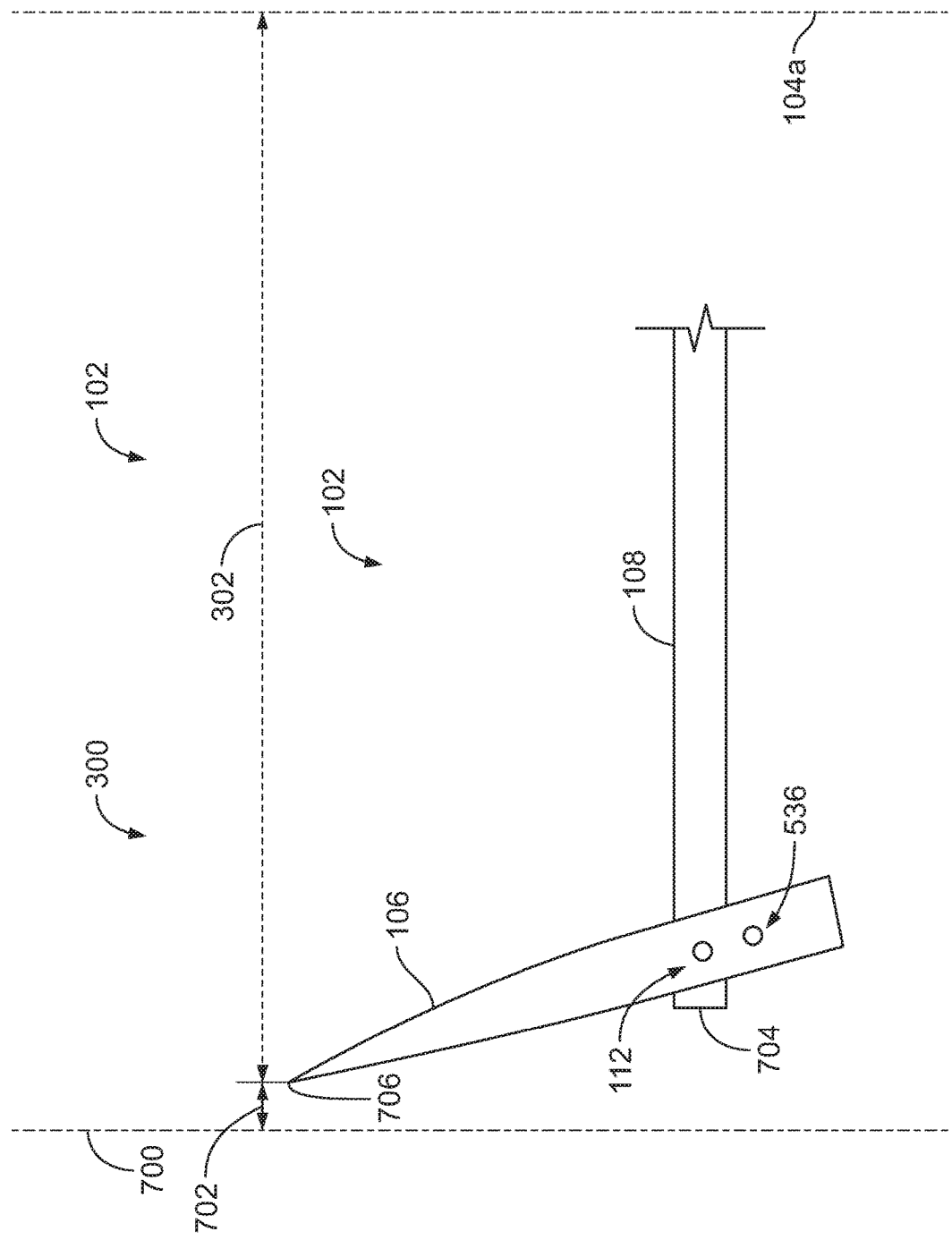
FIG. 7 is a partial, schematic side view of the example foldable wing of FIGS. 1-6 shown in the example folded position.

FIG. 7 is a partial, schematic side view of the foldable wing 102 of FIGS. 1-6 shown in the folded position 300. The foldable wing 102 can be configured with a margin 702 to maintain the aircraft 100 in compliance with an International Civil Aviation Organization (ICAO) dimensional limitation 700 due to bending of the foldable wing 102 when the aircraft 100 is parked or moving along a taxiway, account for fuel weight of fuel stored in the folding wing tip 106 and/or the fixed wing portion 108, and/or account for bending due to wind loads. As shown in FIG. 7, an outermost end 704 of the fixed wing portion 108 and an outermost end 706 of the folding wing tip 106 are within the ICAO dimensional limitation 700 when the foldable wing 102 is in the folded position 300.

As notated above, Airport designs are based on International Civil Aviation Organization (ICAO) Codes A through F, which establish dimensional limits on wingspans, landing gear, width, length, etc. Most airports are designed to accommodate aircraft up to ICAO Code E, which limits wingspans to less than 65 meters so that aircraft can fit through runways, taxiways, gate areas, etc. The folding wing tip 106 of the aircraft 100 enables the aircraft 100 to provide the first wingspan 202 (FIG. 2) that is less than or equal to the Code F wingspan limitation 802, but greater than a Code E wingspan limitation 804 (e.g., greater than 65 meters). The folding wing tip 106 of the aircraft 100 enable the first wingspan 202 to be reduced to the second wingspan 302 (FIG. 3) so that the aircraft can fit within the current airport infrastructure (e.g., parking areas, taxiways, etc.) in compliance with ICAO Code E size limitations (e.g., under 65 meters), for example. In some examples, the folding wing tips 106 of each foldable wing 102 are about 12 feet in length. As such, the first wingspan 202 (FIG. 2) can be decreased by about 24 feet by folding the folding wing tips 106 of the foldable wings 102.

In some examples, the foldable wings 102 disclosed herein can be implemented with other types and/or sized aircrafts. For example, the foldable wings 102 can be structured to provide the first wingspan 202 of approximately between 30 meters and 65 meters when the foldable wings 102 are in the unfolded position 200 and provide the second wingspan 302 of approximately between 25 meters and 60 meters when the foldable wings 102 are in the folded position 200. In some examples, the foldable wings 102 disclosed herein can be structured to provide any suitable distance of the first wingspan 202 and the second wingspan 302 by varying (e.g., increasing) the semi-span length 416 of the folding wing tip 106, the folding wing tip chord length 418, the length of the fixed wing portion 108, and/or the distance 410 of the hinge axis 110 relative to the fuselage centerline 104a.

Figure 8:
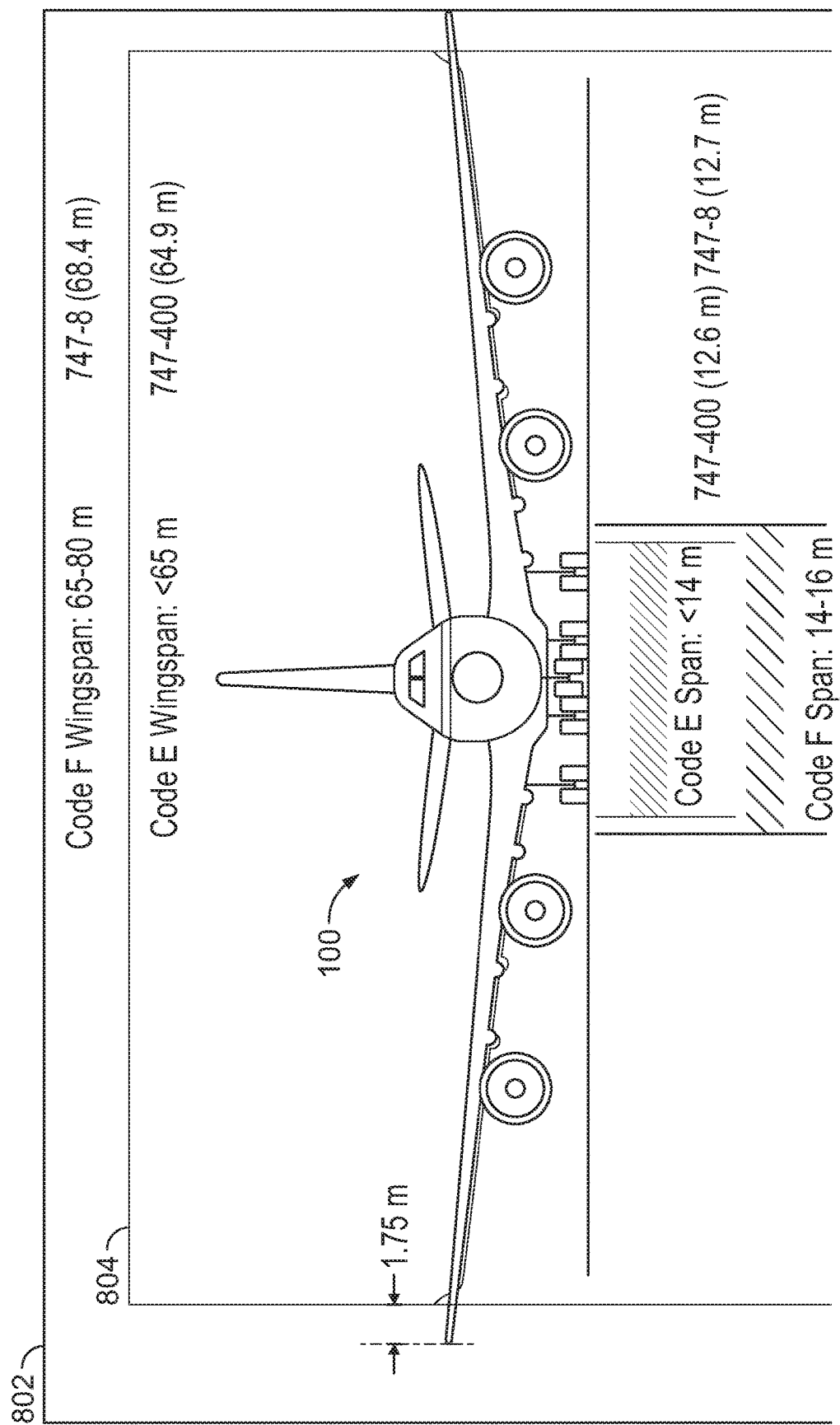
FIG. 8 is a front view of the example aircraft of FIGS. 1-7 with reference to dimensional limitations of a first code of an International Civil Aviation Organization (ICAO) and dimensional limitations of a second code of the ICAO.

FIG. 8 is a front view of the aircraft 100 with reference to dimensional limitations of a first code of the International Civil Aviation Organization (ICAO) and dimensional limitations of a second code of the ICAO. For example, the first code is representative of Code E dimensional requirements and the second code is representative of Code F dimensional requirements. The aircraft 100 complies with ICAO Code E and Code F limitations including, for example, landing clearance limitations, obstacle clearance limitations, and snow removal limitations. In some examples, the aircraft 100 (e.g., or other types of aircraft) can be structured with the foldable wings 102 to comply with other codes of the ICAO (e.g., Code A-D limitations) and/or any other limitation(s).

FIG. 9 is a front view of the aircraft 100 relative to an ICAO Code E landing clearance limitation 900. The aircraft 100 satisfies an inner approach limitation (e.g. 120 meters for a Code E approach) when the foldable wings 102 are in the deployed position 200 and satisfies (e.g. clears or does not extend beyond) an obstacle free zone 902 (OFZ) when the foldable wings 102 are in the stored position 300.

FIG. 10 is a front view of the aircraft 100 relative to an ICAO Code F landing clearance limitation 1000.

Figure 11:
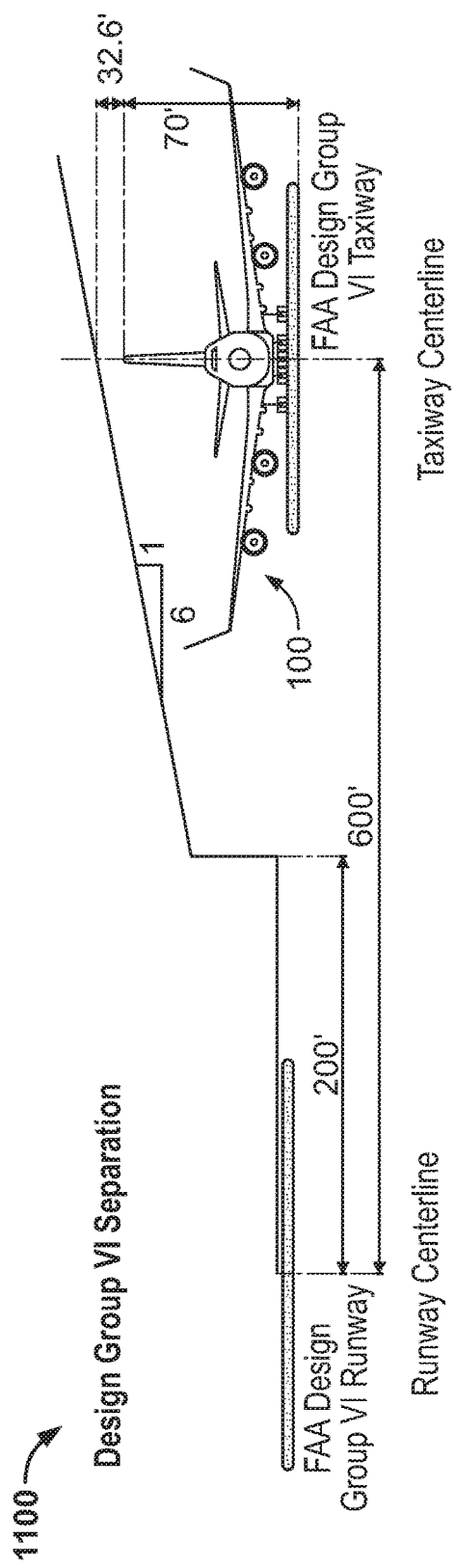
FIG. 11 is a schematic view of the example aircraft of FIGS. 1-7 with reference to ICAO Code E obstacle clearance limitation.

FIG. 11 is a schematic view of the aircraft 100 relative to ICAO Code E obstacle clearance limitation 1100.

Figure 12:
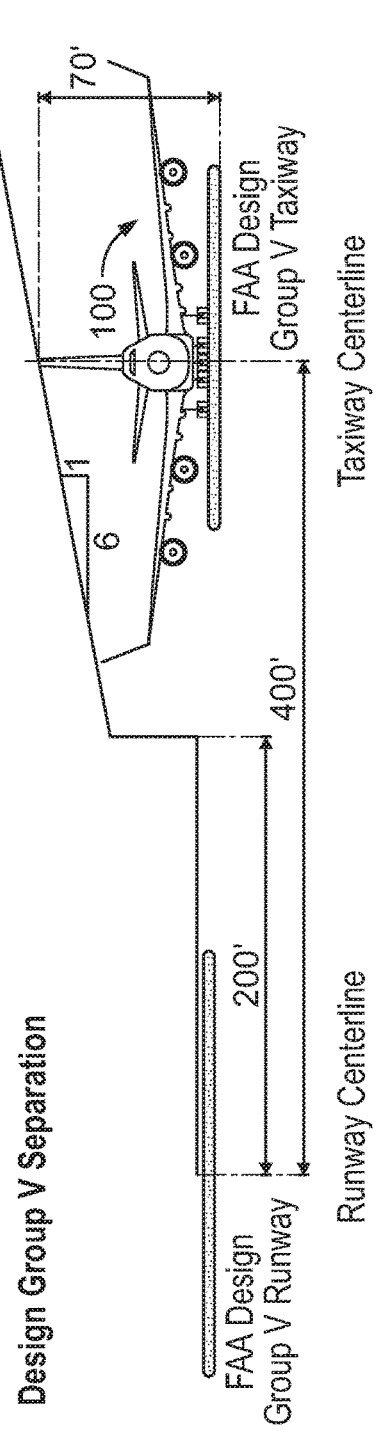
FIG. 12 is a schematic view of the example aircraft of FIGS. 1-7 with reference to ICAO Code F obstacle clearance limitation.

FIG. 12 is a schematic view of the aircraft 100 relative to ICAO Code F obstacle clearance limitation 1200. The foldable wings 102 of the aircraft 100 of the illustrated example is formed to comply with an obstacle free zone limitation of the ICAO. However, in some examples in which compliance with the ICAO codes is not needed, the folding wing tips 106 can be formed with a longer dimensional length (e.g., the semi-span length 416 and/or the folding wing tip chord length 418) and be structurally supported with the foldable wing 102.

Figure 13:
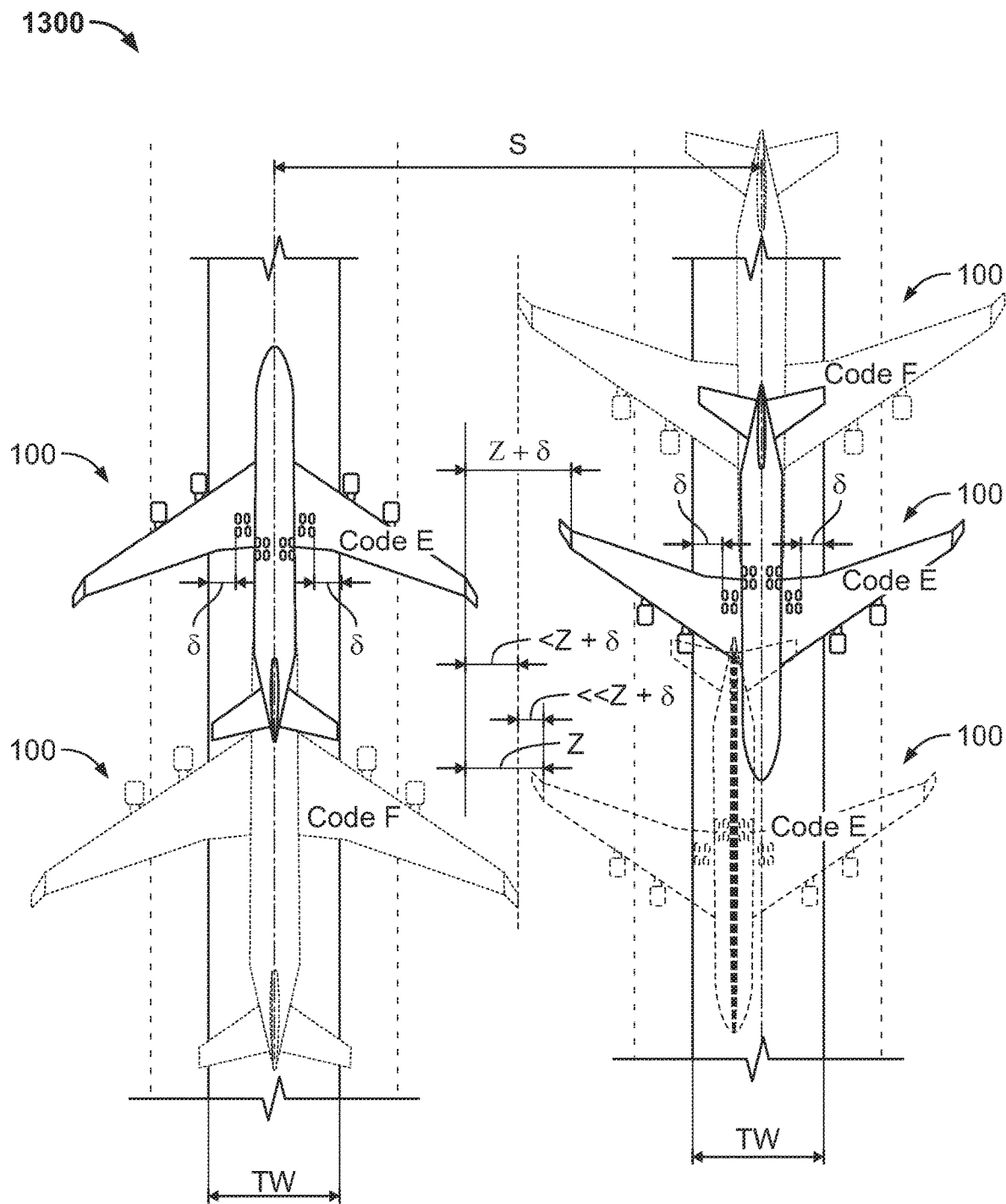
FIG. 13 is a schematic illustration of the example aircraft of FIGS. 1-7 and an aircraft 1300 with reference to ICAO Code E and Code F taxiway separation distances.

FIG. 13 is a schematic illustration of the aircraft 100 and an aircraft 1300 relative to ICAO Code E and Code F taxiway to taxiway separation distances. Thus, the aircraft 1300 can be identical to the aircraft 100 of FIGS. 1-8.

At least some of the aforementioned examples include one or more features and/or benefits including, but not limited to, the following:

In some examples, an aircraft includes a fixed wing portion and a foldable wing tip defining a foldable wing tip chord length. A hinge interface pivotally couples the foldable wing tip and the fixed wing portion. The hinge interface has a first hinge and a second hinge defining a hinge axis that is substantially parallel to a fuselage centerline. Each of the first hinge and the second hinge has a first dimension in a spanwise direction and a second dimension in a chordwise direction. The first dimension is greater than the second dimension. The second hinge is positioned adjacent a midpoint of the foldable wing tip chord length and the first hinge being positioned fore of the second hinge.

In some examples, the first hinge defines a first torque box having a first wing rib and a second wing rib, the first wing rib being attached to a front spar of a fixed wing box of the fixed wing portion and a front spar of a foldable wing box of the foldable wing tip, the second wing rib being attached to a closeout rib of the fixed wing box of the fixed wing portion and a closeout rib of the foldable wing box of the foldable wing tip.

In some examples, the first hinge is non-parallel relative to the front spar of the fixed wing box.

In some examples, the hinge interface includes a second hinge defining the hinge axis, the first hinge and the second hinge are spaced apart in a chordwise direction In some examples, the first hinge is spaced from the second hinge in a chordwise direction by a distance approximately between 0.8 meters (2.6 feet) and 1.0 meters (3.3 feet).

In some examples, the second hinge defines a second torque box having a third wing rib and a fourth wing rib, the third wing rib being attached to a rear spar of the fixed wing box of the fixed wing portion and a rear spar of the foldable wing box of the foldable wing tip, the fourth wing rib being attached to a closeout rib of the fixed wing box of the fixed wing portion and a closeout rib of the foldable wing box of the foldable wing tip.

In some examples, the second hinge is non-parallel relative to the rear spar of the fixed wing box.

In some examples, at least one of the first hinge or the second hinge provides a primary load path between the foldable wing tip and the fixed wing portion.

In some examples, the hinge interface is located outboard relative to an outermost leading edge slat and an outermost aileron of the fixed wing portion.

In some examples, a latch interface defining a latch axis substantially parallel relative to the hinge axis, the hinge axis being spaced from the latch axis by a distance of approximately between 0.25 meters (0.83 feet) and 0.40 meters (1.31 feet).

In some examples, the hinge axis is positioned between the foldable wing tip and the latch axis, and the latch axis is positioned between the hinge axis and the fuselage.

In some examples, the hinge axis is positioned closer to at least one of a center of mass or a center of airloading of the foldable wing tip than the latch axis.

In some examples, the foldable wing tip has a semi-span length of approximately between 10 feet and 14 feet and a foldable wing tip chordwise length of approximately between 9 feet and 11 feet.

In some examples, the aircraft has a first wingspan when the foldable wing tip is in an extended position and a second wingspan when the foldable wing tip is in a folded position, the first wingspan being greater than 65 meters and the second wingspan being less than 65 meters.

In some examples, wherein the first dimension in a spanwise direction is approximately between 0.4 meters (1.3 feet) and 0.6 meters (2.0 feet) and the second dimension in the chordwise direction is approximately between 0.20 meters (0.67 feet) and 0.30 meters (1.00 feet).

In some examples, an aircraft includes a wing having a fixed wing portion and a foldable wing tip. A hinge interface pivotally couples the foldable wing portion to the fixed wing portion. The hinge interface includes a first wing rib and a second wing rib spaced from the first wing rib to define a first hinge. The first wing rib supports a first hinge pin and the second wing rib supports a second hinge pin. Each of the first wing rib and the second wing rib has a longitudinal axis to extend between the foldable wing tip and the fixed wing portion in a direction substantially perpendicular to a fuselage centerline of the aircraft.

In some examples, the hinge interface includes a third wing rib and a fourth wing rib spaced from the third wing rib to define a second hinge, the third wing rib to support a third hinge pin and the fourth wing rib to support a fourth hinge pin, each of the third wing rib and the fourth wing rib having a longitudinal axis to extend between the foldable wing tip and the fixed wing portion in a direction substantially perpendicular to the fuselage centerline of the aircraft.

In some examples, the hinge interface defines a hinge axis passing through the first wing rib, the second wing rib, the third wing rib, and the fourth wing rib, the hinge axis is spaced from a center of mass of the foldable wing tip a distance of approximately between 0.40 meters (1.31 feet) and 0.80 meters (2.62 feet).

In some examples, the second hinge is positioned at a midpoint of a foldable wing tip chord length and the first hinge is positioned a distance from the second hinge in the chordwise direction.

In some examples, an aircraft includes a first wing having a first fixed portion and a first foldable portion, and a second wing having a second fixed portion and a second foldable portion. The first wing and the second wing to provide a first wingspan when the first foldable portion and the second foldable portion are in extended positions. The first wing and the second wing to provide a second wingspan when the first foldable portion and the second foldable portion are in folded positions. The first wingspan is greater than approximately 65 meters and the second wingspan is less than approximately 65 meters. Each of the first and second foldable portions rotates about a hinge axis that is substantially parallel relative to a fuselage centerline.

In some examples, the hinge axis is spaced from a center of mass of the first foldable portion a distance of approximately between 0.40 meters (1.31 feet) and 0.80 meters (2.62 feet).

In some examples, a method includes moving a foldable wing tip relative to a fixed wing portion of an aircraft about a hinge axis that is substantially parallel relative to a fuselage centerline between a stowed position to provide a first wingspan and an extended position to provide a second wingspan greater than the first wingspan, where the foldable wing tip includes a hinge interface to pivotally couple the foldable wing tip and the fixed wing portion. The hinge interface has a first hinge and a second hinge. The second hinge is positioned adjacent a midpoint of the foldable wing tip chord length and the first hinge is positioned fore of the second hinge.

In some examples, the method includes moving the foldable wing tip to the stowed position during a taxiing event.

In some examples, the method includes moving the foldable wing tip to the extended position during flight to enhance an aerodynamic characteristic of the aircraft.

Although certain example methods, apparatus and articles of manufacture have been described herein, the scope of coverage of this disclosure is not limited thereto. On the contrary, this disclosure covers all methods, apparatus and articles of manufacture fairly falling within the scope of the claims.

What is claimed is:

1. An aircraft, comprising:
a fixed wing portion;
a foldable wing tip defining a foldable wing tip chord length; and
a hinge interface to pivotally couple the foldable wing tip and the fixed wing portion, the hinge interface to transition between the foldable wing tip and the fixed wing portion, the hinge interface having a first hinge and a second hinge defining a hinge axis that is substantially parallel to a fuselage centerline, the hinge axis positioned closer to the foldable wing tip than the fixed wing portion, the hinge interface including a latch interface defining a latch axis adjacent the hinge axis and positioned between the hinge axis and the fixed wing portion, each of the first hinge and the second hinge having a first dimension in a spanwise direction and a second dimension in a chordwise direction, the first dimension being greater than the second dimension, the second hinge positioned adjacent a midpoint of the foldable wing tip chord length and the first hinge being positioned fore of the second hinge.

2. The aircraft of claim 1, wherein the first hinge defines a first torque box having a first wing rib and a second wing rib, the first wing rib being attached to a front spar of a fixed wing box of the fixed wing portion and a front spar of a foldable wing box of the foldable wing tip, the second wing rib being attached to a closeout rib of the fixed wing box of the fixed wing portion and a closeout rib of the foldable wing box of the foldable wing tip.

3. The aircraft of claim 2, wherein the first hinge is non-parallel relative to the front spar of the fixed wing box.

4. The aircraft of claim 2, wherein the second hinge defines a second torque box having a third wing rib and a fourth wing rib, the third wing rib being attached to a rear spar of the fixed wing box of the fixed wing portion and a rear spar of the foldable wing box of the foldable wing tip, the fourth wing rib being attached to a closeout rib of the fixed wing box of the fixed wing portion and a closeout rib of the foldable wing box of the foldable wing tip.

5. The aircraft of claim 4, wherein the second hinge is non-parallel relative to the rear spar of the fixed wing box.

6. The aircraft of claim 2, wherein at least one of the first hinge or the second hinge provides a primary load path between the foldable wing tip and the fixed wing portion.

7. The aircraft of claim 1, wherein the first hinge is spaced from the second hinge in a chordwise direction by a distance approximately between 0.8 meters (2.6 feet) and 1.0 meters (3.3 feet).

8. The aircraft of claim 1, wherein the hinge interface is located outboard relative to an outermost leading edge slat and an outermost aileron of the fixed wing portion.

9. The aircraft of claim 1, wherein the latch axis is substantially parallel relative to the hinge axis, the hinge axis being spaced from the latch axis by a distance of approximately between 0.25 meters (0.83 feet) and 0.40 meters (1.31 feet).

10. The aircraft of claim 9, wherein the hinge axis is positioned between the foldable wing tip and the latch axis, and the latch axis is positioned between the hinge axis and the fuselage centerline.

11. The aircraft of claim 9, wherein the hinge axis is positioned closer to at least one of a center of mass or a center of airloading of the foldable wing tip than the latch axis.

12. The aircraft of claim 1, wherein the foldable wing tip has a semi-span length of approximately between 10 feet and 14 feet and a foldable wing tip chordwise length of approximately between 9 feet and 11 feet.

13. The aircraft of claim 1, wherein the aircraft has a first wingspan when the foldable wing tip is in an extended position and a second wingspan when the foldable wing tip is in a folded position, the first wingspan being greater than 65 meters and the second wingspan being less than 65 meters.

14. The aircraft of claim 1, wherein the first dimension in a spanwise direction is approximately between 0.4 meters (1.3 feet) and 0.6 meters (2.0 feet) and the second dimension in the chordwise direction is approximately between 0.20 meters (0.67 feet) and 0.30 meters (1.00 feet).

15. An aircraft, comprising:
a wing having a fixed wing portion and a foldable wing tip; and
a hinge interface to pivotally couple the foldable wing portion to the fixed wing portion, the hinge interface to transition between the fixed wing portion and the foldable wing tip, the hinge interface including:
a first hinge and a second hinge defining a hinge axis substantially parallel to a fuselage centerline;
a first wing rib and a second wing rib spaced from the first wing rib to define the first hinge, the first wing rib and the second wing rib having a dimensional length, the hinge axis positioned between the foldable wing tip and a midpoint of the dimensional length, the first wing rib to support a first hinge pin and the second wing rib to support a second hinge pin, each of the first wing rib and the second wing rib having a longitudinal axis to extend between the foldable wing tip and the fixed wing portion in a direction substantially perpendicular to the fuselage centerline of the aircraft; and
a latch interface defining a latch axis positioned between the hinge axis and the fixed wing portion.

16. The aircraft of claim 15, further comprising a third wing rib and a fourth wing rib spaced from the third wing rib to define the second hinge, the third wing rib to support a third hinge pin and the fourth wing rib to support a fourth hinge pin, each of the third wing rib and the fourth wing rib having a longitudinal axis to extend between the foldable wing tip and the fixed wing portion in a direction substantially perpendicular to the fuselage centerline of the aircraft.

17. The aircraft of claim 16, wherein the hinge axis is spaced from a center of mass of the foldable wing tip a distance of approximately between 0.40 meters (1.31 feet) and 0.80 meters (2.62 feet).

18. The aircraft of claim 16, wherein the second hinge is positioned at a midpoint of a foldable wing tip chord length and the first hinge is positioned a distance from the second hinge in a chordwise direction.

19. An aircraft comprising:
a first wing having a first fixed portion, a first hinge interface, and a first foldable portion; and
a second wing having a second fixed portion, a second hinge interface, and a second foldable portion, the first wing and the second wing to provide a first wingspan when the first foldable portion and the second foldable portion are in extended positions, the first wing and the second wing to provide a second wingspan when the first foldable portion and the second foldable portion are in folded positions, the first wingspan being greater than approximately 65 meters and the second wingspan being less than approximately 65 meters, the first foldable portion to rotate about a first hinge axis and the second foldable portion to rotate about a second hinge axis, the first and second hinge axes being substantially parallel to a fuselage centerline, the first foldable portion having a first latch axis adjacent the first hinge axis and the second foldable portion having a second latch axis adjacent the second hinge axis, the first and second latch axes being substantially parallel to the fuselage centerline, the first hinge axis positioned closer to the first foldable portion than the first latch axis, and the second hinge axis positioned closer to the second foldable portion than the second latch axis.

20. The aircraft of claim 19, wherein the hinge axis is spaced from a center of mass of the first foldable portion a distance of approximately between 0.40 meters (1.31 feet) and 0.80 meters (2.62 feet).

21. An aircraft, comprising:
a fixed wing portion;
a foldable wing tip defining a foldable wing tip chord length;
a transition portion to couple the fixed wing portion and the foldable wing tip;
a hinge interface to pivotally couple the foldable wing tip and the fixed wing portion, the hinge interface defining a hinge axis that is substantially parallel to a fuselage centerline, the hinge axis offset relative to a centerline of the transition portion, the hinge axis positioned closer to the foldable wing than the fixed wing portion; and
a latch interface defining a latch axis adjacent the hinge axis closer to the fixed wing portion than the foldable wing tip.

22. The aircraft of claim 21, wherein the hinge interface includes a first hinge and a second hinge spaced from the first hinge, each of the first hinge and the second hinge having a first dimension in a spanwise direction and a second dimension in a chordwise direction, the first dimension being greater than the second dimension, the second hinge positioned adjacent a midpoint of the foldable wing tip chord length and the first hinge being positioned fore of the second hinge.

23. The aircraft of claim 22, wherein the first hinge defines a first torque box having a first wing rib and a second wing rib, the first wing rib being attached to a front spar of a fixed wing box of the fixed wing portion and a front spar of a foldable wing box of the foldable wing tip, the second wing rib being attached to a closeout rib of the fixed wing box of the fixed wing portion and a closeout rib of the foldable wing box of the foldable wing tip.

24. The aircraft of claim 21, wherein the latch axis is substantially parallel relative to the hinge axis, the latch axis positioned only between the hinge axis and the fixed wing portion.

* * * * *